Patented July 6, 1954

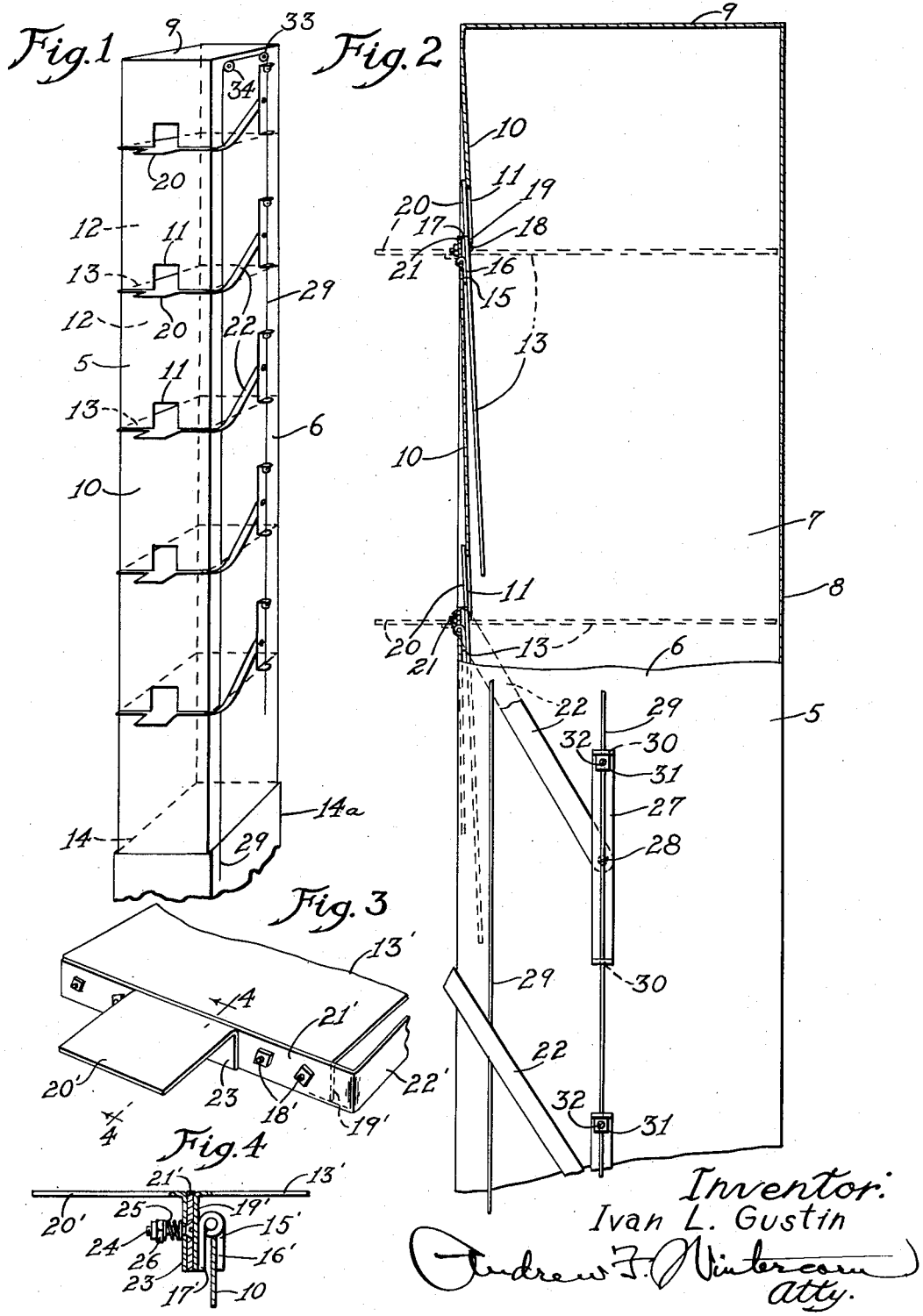
July 6, 1954     I. L. GUSTIN     2,682,726
BIRD TRAP
Filed Aug. 11, 1947
Inventor:
Ivan L. Gustin

2,682,726

UNITED STATES PATENT OFFICE 2,682,726

BIRD TRAP

Ivan L. Gustin, Rockford, Ill.

Application August 11, 1947, Serial No. 767,890

18 Claims. (Cl. 43—61)

This invention relates to bird traps adapted for use on top of and around public buildings and other places to catch starlings, pigeons, and other birds when they become a nuisance.

The principal object of my invention is to provide a multiple compartment trap, in which each compartment has a pivoted trap door type bottom or shelf with a projecting perch arranged to close the entrance automatically when the shelf is dropped, the several compartments being in superimposed relation in a tubular body, so that when the shelves swing downwardly simultaneously the tubular body forms a chute through which all of the birds housed in the trap at the time will be discharged into a bag or cage placed beneath the trap to receive the same. In that way the birds are all caught alive, and martins, robins, and other desirable species may be released and the rest may be exterminated by gas, or in whatever way is considered most humane and economical.

Another object is to provide a trap of the kind mentioned, in which the perches are resiliently mounted relative to the shelves, so that a bird caught between the perch and the front wall of the trap will not be crushed.

Another object is to provide a trap of the kind mentioned, in which the shelves are designed to drop by gravity, and each has an arm extending from its pivoted end alongside the trap for connection of all of the arms with a single supporting wire or rope, which may be conveniently extended upwardly and passed over one or more pulleys and extended downwardly alongside the trap to a convenient point for fastening and remote control of the springing of the trap, the arms preferably having lost motion connections with the wire or rope, so that the several shelves may swing downwardly more or less independently of one another when the trap is sprung, but all will be raised together to a substantially horizontal operative position when the trap is reset. Also, the lost motion connections enable complete closing of the other perches in the event one or more are obstructed by birds caught between the perches and the front wall when the trap is sprung.

The invention is illustrated in the accompanying drawing, in which—

Fig. 1 is a more or less diagrammatic perspective view of a bird trap made in accordance with my invention;

Fig. 2 is a view partly in side elevation and partly in vertical section of the upper portion of the trap of Fig. 1, on a larger scale;

Fig. 3 is a perspective view of the front portion of one of the shelves removed from the trap, showing a modified construction in so far as the connection of the control arm and the perch to the front end of the shelf is concerned, and Fig. 4 is a sectional detail on the line 4—4 of Fig. 3.

Similar reference numerals are applied to corresponding parts throughout the views.

Referring to the drawing, the reference numeral 5 designates a tubular body of rectangular cross-section, which may be of any suitable or preferred construction. For example, wooden construction may be used in the side walls 6 and 7 and rear wall 8 and top wall 9, but the front wall 10 is preferably of sheet metal construction. Sheet metal construction may be used throughout, if preferred. Entrance openings 11 are provided in the front wall, opening into compartments 12 defined between trap door bottoms or shelves 13, the uppermost compartment being, of course, defined between the uppermost shelf and the top wall 9. The shelves are preferably of sheet metal construction. The lower end 14 of the body 5 is left open for discharge of the birds directly into a bag or screen container 14a placed therebeneath, where the size of the trap makes that feasible. However, I may provide an intermediate funnel to fit at its large end detachably or permanently on the lower end of the trap, for discharge of the birds through the small end into the bag or other container. An L-shaped arm 22 is provided for the operation of each trap door 13, the arm being connected by means of the cross-portion 21 thereof to the hinged end of the trap door. Hinges 15 preferably have one leaf 16 welded to the front wall 10 of the trap, the other leaf 17 being fastened by bolts 18 to the forwardly projecting end portion 19 of the shelf and the rearwardly projecting end portion of the associated perch 20, the same bolts also serving to fasten the front cross-portion 21 of the related L-shaped control arm 22 to the shelf. However, I may use a slightly different construction in so far as the fastening of the control arms and the mounting of the perches are concerned, as disclosed in Figs. 3 and 4. As disclosed in those figures, the cross-portion 21' of the L-shaped control arm 22' is fastened by bolts 18' to the downwardly bent flange 19' provided on the front end of the shelf 13', these same bolts 18' serving to fasten the leaf 17' of the hinges 15' that are welded by their other leaves 16' to the front wall 10. The perch 20' has a downwardly projecting rear flange 23 fastened by bolts 24 to the cross-portion 21' of the control arm 22', springs 25 being inserted between the flange 23 and the nuts 26 to be compressed more or less in the tightening of the nuts on the bolts, so as to provide a resilient mounting for the perch. In either case the perches 20 and 20' are of rectangular form and large enough in relation to the entrance openings 11 with which they are associated to close said openings completely when the shelves 13 are swung downwardly, as shown in full lines in Fig. 2. The perches are substantially in coplanar relation with their associated shelves 13. The front wall 10 in each compartment is inclined inwardly and downwardly at an acute angle, so that the associated shelf 13 and perch 20 or 20' in the sprung position lie in a plane substantially parallel to the plane of the front wall, as clearly appears in Fig. 2, thus insuring the more complete shutting out of any light when the trap is sprung and, accordingly, hastening the discharge of the birds from the trap into the bag or other container placed therebeneath to receive them.

The arms 22 or 22', as the case may be, are of sheet metal construction, and have sheet metal U-shaped yokes 27 pivotally connected to the outer ends thereof, as indicated at 28. A wire, cable, or rope 29 is extended through registering openings 30 in the opposite ends of the yokes 27, and has collars 31 fastened thereon by means of set screws 32 to provide lost motion operating connections between the flexible operating element 29 and the arms 22 to raise the shelves 13 to operative position and control the springing of the trap. The flexible element 29 thus connected with the series of arms 22 extends upwardly and over a pulley 33 mounted on the side of the trap at the upper end, and over another pulley 34 mounted in spaced relation to the first pulley, and downwardly alongside the trap to a convenient point for fastening and remote control of the springing of the trap.

In operation, birds are prone to look upon a structure of the kind just described as a shelter, ideal for roosting at night, and they are, therefore, easily lured into entering. In the evening or during the night the trap may be sprung by releasing the flexible element 29, so that the shelves 13, loaded with birds, may drop by gravity to the position shown in full lines in Fig. 2. The perches 20 or 20', as the case may be, will serve to close the openings 11, to prevent the escape of birds, and, should there be one or more perched in or near one or more of the openings 11, the perches 20' will yield enough to prevent crushing such birds, and, incidentally will allow the related shelves to drop far enough so that there will be no interference with the proper functioning of the trap. The lost motion connections between the shelf-operating arms 22 or 22' and the release wire 29 are also of advantage from the standpoint that the shelves may swing downwardly more or less independently of one another when the trap is sprung, and, hence, if one or more of the shelves have their perches obstructed by birds caught between the perches and the front wall of the housing, the other perches will be closed nevertheless and, hence, there is less likelihood of the trap failing. Birds in a confined space, such as that left in the body 5 when the shelves 13 are dropped in the springing of the trap, are unable to fly and will flutter downwardly into the bag or container placed below the body 5 to receive them. Obviously, as each shelf 13 loaded with birds drops, the birds thereon are lowered enough to make room for the dropping of the shelf 13 above, and in that way there is little or no likelihood of birds getting caught between the shelves and the front wall 10 of the body 5. In other words, the birds are not apt to be injured in the operation of the trap, and also will be caught alive so that the desirable species, such as martins, robins, and others may be picked out and released and the rest exterminated by gassing or in whatever other way is considered most humane and economical. These traps may be placed on top of public buildings, and on other buildings, in the vicinity wherever a bird nuisance exists, and they may be mounted on posts or in trees, or on the backs and sides of buildings, wherever it is convenient to catch the birds discharged from the lower end when the traps are sprung. When placed alongside chimneys that provide warmth, the traps operate most efficiently in wintertime, because birds seek warm shelters for roosting.

While I have described the present trap as applicable to the trapping of birds, it will be obvious that it is not limited to such use, but may be used for the trapping of other animals as well.

It is believed the foregoing description conveys a good understanding of the objects and advantages of my invention. The appended claims have been drawn to cover all legitimate modifications and adaptations.

I claim:

1. A trap device comprising an elongated substantially rectangular housing, substantially vertically disposed and closed at its upper end, and having a gravity discharge opening at its lower end, said housing having entrance openings in one side in vertically spaced relation, a plurality of superposed shelves of substantially rectangular form and of a size to nearly fit crosswise inside the housing, so that the uppermost shelf forms the bottom of a top compartment and each shelf beneath cooperates with the shelf above as a bottom of another compartment, the shelves being disposed in vertically spaced substantially parallel relation in said housing and pivoted transversely of one end relative to the housing at the approximate levels of the bottoms of said openings, said shelves normally tending to swing downwardly, means for holding said shelves releasably in raised substantially horizontal positions, and perches on the pivoted ends of said shelves projecting from the housing below said openings and adapted to swing upwardly to close the openings when said shelves swing downwardly.

2. A trap device comprising an elongated substantially rectangular housing, substantially vertically disposed and closed at its upper end, and having a gravity discharge opening at its lower end, said housing having entrance openings in one side in vertically spaced relation, a plurality of superposed shelves of substantially rectangular form and of a size to nearly fit crosswise inside the housing, so that the uppermost shelf forms the bottom of a top compartment and each shelf beneath cooperates with the shelf above as a bottom of another compartment, the shelves being disposed in vertically spaced substantially parallel relation in said housing and pivoted transversely of one end relative to the housing at the approximate levels of the bottoms of said openings, means interconnecting the pivoted ends of said shelves so that the shelves may be swung simultaneously, and perches on the pivoted ends of said shelves projecting from the housing below said openings and adapted to swing upwardly to close the openings when said shelves swing downwardly.

3. A trap device comprising an elongated substantially rectangular housing, substantially vertically disposed and closed at its upper end, and having a gravity discharge opening at its lower end, said housing having entrance openings in one side in vertically spaced relation, a plurality of superposed shelves of substantially rectangular form and of a size to nearly fit crosswise inside the housing, so that the uppermost shelf forms the bottom of a top compartment and each shelf beneath cooperates with the shelf above as a bottom of another compartment, the shelves being disposed in vertically spaced substantially parallel relation in said housing and pivoted transversely of one end relative to the housing at the approximate levels of the bottoms of said openings, said shelves normally tending to swing downwardly, means for holding said shelves releasably in raised substantially horizontal positions, and perches forming substantially coplanar extensions of but yieldably connected with the pivoted ends of said shelves and projecting from the housing below said openings and adapted to swing upwardly to close the openings when said shelves swing downwardly, either of said perches being adapted by virtue of its yieldable connection with its associated shelf to yield so as to allow the shelf associated therewith to swing downwardly relative thereto in the event the closing movement of said perch is blocked.

4. A trap device comprising an elongated substantially rectangular housing, substantially vertically disposed and closed at its upper end, and having a gravity discharge opening at its lower end, said housing having entrance openings in one side in vertically spaced relation, a plurality of superposed shelves of substantially rectangular form and of a size to nearly fit crosswise inside the housing, so that the uppermost shelf forms the bottom of a top compartment and each shelf beneath cooperates with the shelf above as a bottom of another compartment, the shelves being disposed in vertically spaced substantially parallel relation in said housing and pivoted transversely of one end relative to the housing at the approximate levels of the bottoms of said openings, means interconnecting the pivoted ends of said shelves so that the shelves may be swung simultaneously, and perches forming substantially coplanar extensions of but yieldably connected with the pivoted ends of said shelves and projecting from the housing below said openings and adapted to swing upwardly to close the openings when said shelves swing downwardly, either of said perches being adapted by virtue of its yieldable connection with its associated shelf to yield so as to allow the shelf associated therewith to swing downwardly relative thereto in the event the closing movement of said perch is blocked.

5. A trap device comprising a substantially rectangular housing substantially vertically disposed and closed at its upper end and having an open lower end, said housing having an entrance opening in one side, a substantially rectangular shelf in said housing pivoted at one end relative to the housing at the approximate level of the bottom of the opening, an operating arm disposed alongside said housing and connected to the pivoted end of said shelf to swing the same, manually controlled means connected with said arm to transmit swinging movement to the shelf, and a perch forming a substantially coplanar extension of but yieldably connected with the pivoted end of said shelf and projecting from the housing below said opening and adapted to swing up to close said opening when the shelf swings down, said perch being adapted by virtue of its yieldable connection with the shelf to yield to allow the shelf to swing down relative to it in the event the closing of the perch on the opening is obstructed.

6. A trap device comprising an elongated substantially rectangular housing, substantially vertically disposed and closed at its upper end, and having a gravity discharge opening at its lower end, said housing having entrance openings in one side in vertically spaced relation, movable shelves of substantially rectangular form disposed in vertically spaced substantially parallel relation in said housing defining compartments into which the openings open, movable closures for said openings, and means interconnecting the shelves and closures whereby said openings are closed and the shelves are retracted substantially simultaneously.

7. A trap device comprising an elongated substantially rectangular housing, substantially vertically disposed and closed at its upper end, and having a gravity discharge opening at its lower end, said housing having entrance openings in one side in vertically spaced relation, shelves of substantially rectangular form disposed in vertically spaced substantially parallel relation in said housing and pivoted at one end relative to the housing at the approximate levels of the bottoms of said openings, said shelves normally tending to swing downwardly, an operating arm for each shelf disposed alongside said housing and connected to the pivoted end of the shelf, means interconnecting the arms for joint operation of the shelves, and perches on the pivoted ends of said shelves projecting from the housing below said openings and adapted to swing upwardly to close the openings when said shelves swing downwardly.

8. A trap device comprising an elongated substantially rectangular housing, substantially vertically disposed and closed at its upper end, and having a gravity discharge opening at its lower end, said housing having entrance openings in one side in vertically spaced relation, shelves of substantially rectangular form disposed in vertically spaced substantially parallel relation in said housing and pivoted at one end relative to the housing at the approximate levels of the bottoms of said openings, said shelves normally tending to swing downwardly, an operating arm for each shelf disposed alongside said housing and connected to the pivoted end of the shelf, a single operating element for joint operation of the shelves, means providing lost motion operating connections between said element and said arms, and perches on the pivoted ends of said shelves projecting from the housing below said openings and adapted to swing upwardly to close the openings when said shelves swing downwardly.

9. A device as set forth in claim 8, wherein the means providing the lost motion connection comprises U-shaped yokes pivoted on the ends of said arms, having openings in the arms therethrough which the operating element extends, and collars adjustably fixed on the operating element, one between the arms of each yoke.

10. A trap device comprising an elongated substantially rectangular housing, substantially vertically disposed and closed at its upper end, and having a gravity discharge opening at its lower end, said housing having entrance openings in one side in vertically spaced relation, a plurality of superposed shelves of substantially rectangular form and of a size to nearly fit crosswise inside the housing, so that the uppermost shelf forms the bottom of a top compartment and each shelf beneath cooperates with the shelf above as a bottom of another compartment, the shelves being disposed in vertically spaced substantially parallel relation in said housing and pivoted transversely of one end relative to the housing at the approximate levels of the bottoms of said openings, means interconnecting said shelves so that the shelves may be swung simultaneously, and perches on the pivoted ends of said shelves projecting from the housing below said openings and adapted to swing upwardly to close the openings when said shelves swing downwardly.

11. A trap device comprising a substantially rectangular housing substantially vertically disposed and closed at its upper end and having the whole lower end open, said housing having an entrance opening in one side, a substantially rectangular bottom of the same size as the open lower end of and forming a floor for said housing pivoted at one end relative to the housing at the approximate level of the lower end of the entrance opening, said bottom normally tending to swing down by gravity to a nearly vertical position, an arm outside said housing attached at its one end to the pivoted end of said bottom, manually operable means connected to said arm, said means having a portion thereof adapted to be moved downwardly to swing said bottom to a substantially horizontal position, and a perch on the pivoted end of said bottom projecting from the housing below said entrance opening and adapted to swing up to close said entrance opening when said bottom swings down, there being nothing in said housing to serve as a perch or floor when said bottom swings down.

12. A trap device comprising a substantially rectangular housing substantially vertically disposed and closed at its upper end and having the whole lower end open, said housing having an entrance opening in one side, a substantially rectangular bottom of the same size as the open lower end of and forming a floor for said housing pivoted at one end relative to the housing at the approximate level of the lower end of the opening, said bottom normally tending to swing down by gravity to a nearly vertical position, an arm outside said housing, operable manually, attached to one end to the pivoted end of said bottom and having means connected with the free end of the arm for holding the bottom releasably in raised substantially horizontal position, and a perch forming a substantially coplanar extension of but yieldably connected with the pivoted end of said bottom and projecting from the housing below said opening and adapted to swing up to close said opening when the bottom swings down, said perch being adapted by virtue of its yieldable connection with the bottom to yield to allow the bottom to swing down relative to it in the event the closing of the perch on the opening is obstructed, there being nothing in said housing to serve as a perch or floor when said bottom swings down.

13. A trap device comprising an elongated substantially rectangular housing, substantially vertically disposed and closed at its upper end, and having a gravity discharge opening at its lower end, said housing having entrance openings in one side in vertically spaced relation, movable shelves of substantially rectangular form disposed in vertically spaced substantially parallel relation in said housing defining compartments into which the openings open, and movable closures for said openings yieldably connected with said shelves, whereby said openings are closed when the shelves are retracted, but either of said closures by virtue of its yieldable connection with its associated shelf is adapted to yield so as to allow the shelf associated therewith to swing downwardly in the event the closing movement of the closure is blocked.

14. A trap device comprising an elongated substantially rectangular housing, substantially vertically disposed and closed at its upper end, and having a gravity discharge opening at its lower end, said housing having entrance openings in one side in vertically spaced relation, a plurality of superposed shelves of substantially rectangular form and of a size to nearly fit crosswise inside the housing, so that the uppermost shelf forms the bottom of a top compartment and each shelf beneath cooperates with the shelf above as a bottom of another compartment, the shelves being disposed in vertically spaced substantially parallel relation in said housing and pivoted transversely of one end relative to the housing at the approximate levels of the bottoms of said openings, said shelves normally tending to swing downwardly, means for holding said shelves releasably in raised substantially horizontal positions, and movable closures for said openings connected with the shelves to close the openings when the shelves swing downwardly.

15. A trap device comprising an elongated substantially rectangular housing, substantially vertically disposed and closed at its upper end, and having a gravity discharge opening at its lower end, said housing having entrance openings in one side in vertically spaced relation, a plurality of superposed shelves of substantially rectangular form and of a size to nearly fit crosswise inside the housing, so that the uppermost shelf forms the bottom of a top compartment and each shelf beneath cooperates with the shelf above as a bottom of another compartment, the shelves being disposed in vertically spaced substantially parallel relation in said housing and pivoted transversely of one end relative to the housing at the approximate levels of the bottoms of said openings, means interconnecting the pivoted ends of said shelves so that the shelves may be swung simultaneously, and movable closures for said openings connected with the shelves to close the openings when the shelves swing downwardly.

16. A trap device comprising a substantially rectangular housing substantially vertically disposed and closed at its upper end and having an open lower end, said housing having an entrance opening in one side, a substantially rectangular shelf in said housing pivoted at one end relative to the housing at the approximate level of the bottom of the entrance opening, said shelf tending to swing downward by gravity to a near vertical position, an operating arm disposed alongside said housing and connected at its one end to the pivoted end of said shelf, manually operable means connected to said arm, said means having a portion thereof adapted to be moved downwardly to swing said shelf to a substantially horizontal position, and a closure for said entrance opening connected with said shelf to close said entrance opening when said shelf swings down.

17. A trap device comprising a substantially rectangular housing substantially vertically disposed and closed at its upper end and having an open lower end, said housing having an entrance opening in one side, a substantially rectangular shelf in said housing pivoted at one end relative to the housing at the approximate level of the bottom of the opening, an operating arm disposed alongside said housing and connected to the pivoted end of said shelf to swing the same, manually controlled means connected with said arm to transmit swinging movement to the shelf, and a closure for said opening yieldably connected with said shelf to close said opening when the shelf swings down, said closure being adapted by virtue of its yieldable connection with the shelf to yield to allow the shelf to swing down in the event movement of the closure is obstructed.

18. A trap device comprising an elongated substantially rectangular housing, substantially vertically disposed and closed at its upper end, and having a gravity discharge opening at its lower end, said housing having entrance openings in one side in vertically spaced relation, shelves of substantially rectangular form disposed in vertically spaced substantially parallel relation in said housing and pivoted at one end relative to the housing at the approximate levels of the bottoms of said openings, said shelves normally tending to swing downwardly, an operating arm for each shelf disposed alongside said housing and connected to the pivoted end of the shelf, a single operating element for joint operation of the shelves, means providing lost motion operating connections between said element and said arms, and movable closures for said openings connected with said shelves to close the openings when the shelves swing downwardly.

References Cited in the file of this patent

UNITED STATES PATENTS

| Number | Name | Date |
|---|---|---|
| 386,757 | Regester | July 24, 1888 |
| 881,677 | Goodenough | Mar. 10, 1908 |
| 1,192,726 | Andrews | July 25, 1916 |
| 1,573,930 | Gilmore | Feb. 23, 1926 |
| 1,581,444 | Holroyd | Apr. 20, 1926 |
| 1,603,461 | Harlacher | Oct. 19, 1926 |
| 1,647,723 | Casali | Nov. 1, 1927 |
| 1,713,900 | Hanson | May 21, 1929 |
| 1,864,664 | Muhleisen | June 28, 1932 |
| 2,160,986 | Rafferty et al. | June 6, 1939 |
| 2,392,322 | Hill | Jan. 8, 1946 |

OTHER REFERENCES

U. S. Dept. of Agriculture, Miscellaneous Circular No. 18, Instruction for Banding Birds, May 1924, page 12, Fig. 12.